United States Patent
Batta

[15] 3,636,679
[45] Jan. 25, 1972

[54] SELECTIVE ADSORPTION GAS SEPARATION PROCESS

[72] Inventor: Louis Bela Batta, Grand Island, N.Y.
[73] Assignee: Union Carbide Corporation, New York, N.Y.
[22] Filed: Jan. 4, 1971
[21] Appl. No.: 103,768

Related U.S. Application Data

[63] Continuation-in-part of Ser. No. 787,847, Dec. 30, 1968, Pat. No. 3,564,816.

[52] U.S. Cl..........................................55/26, 55/62, 55/75
[51] Int. Cl........................................................B01d 53/84
[58] Field of Search.....................55/25, 26, 58, 62, 75, 179

[56] References Cited

UNITED STATES PATENTS

| | | | |
|---|---|---|---|
| 3,338,030 | 8/1967 | Foldbauer, Jr. | 55/62 |
| 3,430,418 | 3/1969 | Wagner | 55/25 |

*Primary Examiner*—Reuben Friedman
*Assistant Examiner*—Charles N. Hart
*Attorney*—Paul A. Rose, Harrie M. Humphreys, John C. LeFever and Lawrence G. Kastriner

[57] ABSTRACT

Gas mixtures such as air are separated in selective adsorbent beds to produce low-pressure product such as oxygen by simultaneous compressed air-oxygen introduction at opposite ends for partial repressurization, further repressurization with only air, and then product oxygen discharge.

10 Claims, 7 Drawing Figures

| Cycle Time, Seconds | Bed A | Bed B |
|---|---|---|
| 0-15 | Press. Equal. | Repressure |
| 15-30 | Cocur. Depress. | Repressure |
| 30-35 | Counter. Depress. | Repressure |
| 35-60 | Purge | Repressure |
| 60-75 | Repressure | Press. Equal. |
| 75-90 | Repressure | Cocur. Depress. |
| 90-95 | Repressure | Counter. Depress. |
| 95-120 | Repressure | Purge |

Feed → Product

FIG.5

INVENTOR
LOUIS B. BATTA
BY John C. Le Devor
ATTORNEY

SELECTIVE ADSORPTION GAS SEPARATION PROCESS

CROSS REFERENCE TO RELATED APPLICATION

This application is a continuation-in-part of Ser. No. 787,847 filed Dec. 30, 1968 and now U.S. Pat. No. 3,564,816 in the name of Louis B. Batta.

BACKGROUND OF THE INVENTION

This invention relates to a process for separating gas mixtures by selective adsorption.

Adiabatic pressure swing adsorption systems are well known for separating gas mixtures having selectively adsorbable components. One such system is described in Wagner U.S. Pat. No. 3,430,418 wherein the product (unadsorbed) gas is delivered at substantially the feed pressure. In the Wagner system at least four separate adsorbent beds are required and piped in parallel flow relationship. Each bed proceeds through four distinct cycle operations: (1) adsorption at constant (feed) pressure, (2) void gas recovery, (3) adsorbate rejection, and (4) repressurization. Adsorption at constant feed pressure is obtained by flowing feed gas through the adsorbent bed and simultaneously delivering nonadsorbed product from the bed at substantially feed pressure. Void gas recovery is accomplished by cocurrently depressurizing the bed and using the recovered high-purity void space gas for repressurizing a second purged bed and also for purging a third depressurized bed. Adsorbate rejection is accomplished by countercurrently depressurizing the bed and then countercurrently purging same at low pressure with high-purity void space gas. Repressurization is achieved with gas from which the adsorbate has been either completely or mostly removed. In particular, the necessary gas is obtained partially from a bed being cocurrently depressurized, i.e., void space gas, and partly from another bed on its adsorption stroke, i.e., product gas. The four distinct cycle operations are preferably equal in duration and as previously indicated at least four beds are needed to obtain continuous flow of feed and product. The Wagner system permits recovery of the product component stored within the bed at the end of the adsorption step, a portion of which may be coadsorbed with the preferentially adsorbed component of the feed gas and the balance being stored in the gas phase within the bed, i.e., the void space gas. It is essential for efficient use of the Wagner system to have an adsorbent bed available to receive the cocurrent depressurization gas at the moment in the cycle when such gas is ready to be discharged from another bed.

In some instances, the extra cost and complexity of providing four beds rather than a lesser number makes the Wagner system uneconomical despite its remarkable high product recovery and purity. By way of comparison with a three-bed system, the fourth bed represents an increase of one-third in the investment in tankage, and the increase in associated valves and piping is of the same order. Moreover, the fourth bed would represent a net increase in total adsorbent bed volume which adds to the cost of the adsorbent.

Attempts to adapt the Wagner system for use in three instead of four beds result in severe flow imbalance. This is because at certain moments in the cycle there is a huge amount of product available for withdrawal—far more than the average rate of production and far more than can be immediately utilized by the consumer. As an alternative to discarding the momentary excess of product, large ballast tanks and product compressors are needed to store the excess product gas until a period of the cycle when this gas may be utilized in one of the beds. On the other hand, at other moments in a three-bed Wagner system, all of the product gas available from the adsorption beds is insufficient to meet even the internal demands for purging and repressurization. Again, the ballast tanks are needed to furnish the deficiency of product, both for internal needs in the system and the external needs of the consumer. If the Wagner cycle steps are rearranged to make product flow more uniform and thus alleviate the flow imbalance problem at the consumer end, unfortunately fluctuations and interruptions in the flow of compressed feed gas to the system will have occurred.

The foregoing flow imbalance problem, resulting from an attempted adaptation of the Wagner system to three beds, is particularly acute in gas separations where the nonselectively adsorbed components of the feed gas are appreciably coadsorbed in the beds. By way of example, although nitrogen is preferentially adsorbed by calcium zeolite A at ambient temperatures, the nonpreferentially adsorbed oxygen is coadsorbed by the same material. Under these circumstances a very large amount of the nonpreferentially adsorbed product fraction is loaded onto the adsorbent during repressurization by such product. During the subsequent adsorption step, this coadsorbed product is displaced from the adsorbent by the more strongly adsorbed feed gas component. This means that a very large quantity of the coadsorbed product is continually held within the system. As the cycle progresses through the steps of repressurization and adsorption, the internal flow rate of the coadsorbed product become very high and can easily reach three or four times the average delivery rate of the product from the plant.

An object of this invention is to provide an improved process for separation of gas mixtures by selective adsorption which affords the same high-purity product and high recovery of the product achievable with prior art systems but with less than four adsorbent beds.

Other objects and advantages of this invention will be apparent from the ensuing disclosure and appended claims.

SUMMARY

This invention relates to an adiabatic process for separating gas mixtures by selective adsorption of at least one component at higher pressure and desorption by pressure reduction.

At least two beds of selective adsorbent material are provided each having inlet and discharge ends, and the gas mixture to be separated is introduced at superatmospheric pressure to the first bed inlet end, the bed having previously been cleaned of the selectively adsorbed one component and initially at lower pressure. Simultaneously with this gas mixture introduction, one-component-depleted gas is introduced initially at substantially the first highest superatmospheric pressure to the discharge end of the first bed. Also simultaneously with the gas mixture one-component-depleted gas introduction, gas is released from the discharge end of a second adsorbent bed having previously received the gas mixture at its inlet end in sufficient quantity for an adsorption front of the one component to have been formed at the inlet end and progressively moved to a position intermediate the inlet and discharge ends. The second bed is initially at substantially the first highest pressure so that the pressure of the released gas progressively diminishes as the bed is concurrently depressurized. Since the second bed has only been partially loaded with the one component, the latter is adsorbed in the unloaded portion as gas flows toward the discharge end during this releasing step. Accordingly, the gas released from the second bed discharge end is substantially freed of the one component as long as the adsorption front is entirely within the bed. One part of the so-released gas is flowed to the first bed discharge end as the aforementioned one-component-depleted gas and another part is simultaneously discharged as product. The aforementioned gas flows are continued until the gas pressures in the first and second adsorbent beds are substantially equal whereupon the one-component-depleted gas flow from the second to the first bed is terminated.

The introduction of the gas mixture is continued to the first bed inlet end after the one-component-depleted gas flow termination, thereby further repressurizing the first bed to higher pressure above the first second-bed equalization pressure. Gas depleted of the one component is released from the discharge end of the further repressurized first bed and one part thereof is employed for purging the one component adsorbate from the second bed at the lowest pressure of the process. Another part of the released gas is used to repressurize another adsorbent bed having previously been cleaned of the one component. This gas is introduced to the discharge end of such bed for countercurrent repressurization. Still another part of the released gas is discharged as product. The first bed is purged of the one component by introducing one-component-depleted gas from a different bed to the discharge end of the first bed for countercurrent flow therethrough at the lowest pressure.

DESCRIPTION OF THE PREFERRED EMBODIMENTS

It will be apparent from the preceding summary that an appreciable part of the one-component-depleted gas is delivered during bed depressurization over a pressure range decreasing from highest superatmospheric pressure to lower pressure above purge pressure. The one-component-depleted gas is obtained from the discharge end of the bed by two mechanisms: (a) by separation of gas mixture flowing to the adsorption front where the one component is adsorbed on the bed, and (b) by displacement of nonpreferentially adsorbed component from the length of unloaded bed ahead of the adsorption front. Gas mixture may flow to the adsorption front as a result of the introduction of gas mixture at the inlet end of the bed simultaneously with withdrawal of one-component-depleted gas. Alternatively such gas mixture may already be present within the bed behind the adsorption front and may flow to the front by the expansion permitted by the withdrawal of one-component-depleted gas. The displacement of nonpreferentially adsorbed component both adsorbed and nonadsorbed from the length of unloaded bed may be the result of the advancement of the adsorption front toward the discharge end of the bed, or it may be the result of the expansion of the nonpreferentially adsorbed component permitted by the withdrawal of one-component-depleted gas. For some gas mixtures such as air for which the nonpreferentially adsorbed component is appreciably adsorbed on the bed, the nonpreferentially adsorbed component displaced from the length of unloaded bed may be derived primarily from the adsorbed phase. For other gas mixtures such as hydrogen- or helium-bearing feeds, the nonpreferentially adsorbed component is only slightly adsorbed and the nonpreferentially adsorbed component displaced from the length of unloaded bed is derived to a relatively large degree by expansion of the unadsorbed gas.

The one-component-depleted gas comprises the product gas delivered to the consumer and also the gas utilized internally of the system for pressure equalization, for repressurization and for purging. Since the product is derived from one-component-depleted gas which is at least in part at pressure below the highest superatmospheric pressure of the process of this invention, the latter is best suited for product gas uses wherein the gas is consumed at lower than feed pressure or uses which are not penalized by accepting low-pressure product. For example, oxygen is being increasingly used instead of air for aeration of BOD-containing water such as municipal sewage and the oxygen is introduced to the aeration chamber at low pressure only slightly above atmospheric. The instant process may be advantageously used to separate air and provide lower than feed pressure oxygen product which is passed directly to the aeration chamber of a municipal sewage treatment plant.

The prior art has proposed repressurization-depressurization selective adsorption processes without a constant pressure adsorption step, but they have been characterized by serious disadvantages. These prior art processes have repressurized the cleaned adsorbent beds with only the feed gas mixture, presumably because the repressurization step represents the only opportunity in the cycle to introduce feed and the amount of separated product is dependent on the amount of feed introduced. However, in many instances the amount of feed required to repressurize an adsorbent bed is greater than the amount of feed which the bed is capable of separating into the desired products. It will be apparent that if excess feed gas mixture is introduced to the bed, either the excess adsorbate component must pass out with the nonpreferentially adsorbed product (so that product purity will suffer) or the pressure to which cocurrent depressurization proceeds must be increased to avoid breakthrough, leaving more preferentially adsorbed component in the bed to blow down countercurrently to waste (so that product recovery percentage from feed will suffer).

Other types of prior art pressure swing adsorption processes have used only the one-component-depleted gas and/or the product gas (discharged at steady feed pressure) for complete repressurization of a cleaned bed to feed pressure. This however is impossible in the instant process wherein no significant quantity of such gas is available at feed pressure.

As stated in the preceding summary, this process employs simultaneous partial repressurization of the cleaned bed by introduction of feed gas mixture at the inlet end and one-component-depleted gas of product purity at the discharge end. The use of high-purity one-component-depleted gas for partial repressurization provides several beneficial effects. First, the countercurrent flow of high-purity gas cleans the product or discharge end of the bed thereby serving as additional purge gas for this critical zone. Second, at low-pressure levels of repressurization the adsorbed component mass transfer front produced by feed gas repressurization tends to be weak and diffuse. The counterflow of high-purity adsorbate-free gas helps to compress and sharpen the front so that premature breakthrough of adsorbate does not occur. Third, the use of high-purity gas facilitates repressurization without overloading the bed with the preferentially adsorbed component of the feed. Thus, all the feed gas mixture introduced may be separated to provide product gas of desired purity.

In a constant-pressure feed gas mixture-product gas discharge process of the type described in Wagner U.S. Pat. No. 3,430,418, the mass transfer front is initially established at the inlet end and moves progressively toward the discharge end. One might expect that such would not occur in the present process due to the strikingly different process characteristics. To the contrary it has been discovered that the mass transfer front remains sharp and advances smoothly toward the discharge end even though the one-component adsorbate is loaded onto the bed concurrently with a continuing rise in bed pressure.

For an adsorbent bed of given size, the quantity of feed gas mixture introduced relative to the quantity of one-component-depleted gas simultaneously introduced is such that at the completion of the bed repressurization to a predetermined pressure and one-component loading, there remains a well-defined length of clean unused bed adjacent the discharge end. This remaining bed length is used in the succeeding cocurrent depressurization steps for separating the one-component from the gas in the repressurized bed. The gas released from the bed during these steps comprises the nonselectively adsorbed (or nonadsorable) component(s) of the feed gas mixture. One part of this released gas comprises the aforementioned one-component-depleted gas used for partially repressurizing a previously purged bed until the pressures are equalized. Since one-component-depleted gas is not available at the pressure of the feed gas mixture, only the low-pressure phase of repressurization may be conducted with the one-component-depleted gas. The further or final high-pressure phase of repressurization is accomplished with only feed gas.

The process of this invention is characterized in that at least the major part of the feed gas is introduced attendant a rise in adsorbent bed pressure. The bed pressure rises because the net instantaneous rate of gas introduction (inflow minus outflow) exceeds the adsorption capability of the bed. This process is distinct from those wherein at least the major part of the feed gas is introduced during a steady pressure adsorption step, i.e., wherein the net rate of gas introduction equals the adsorption capability of the bed.

Figure 1:
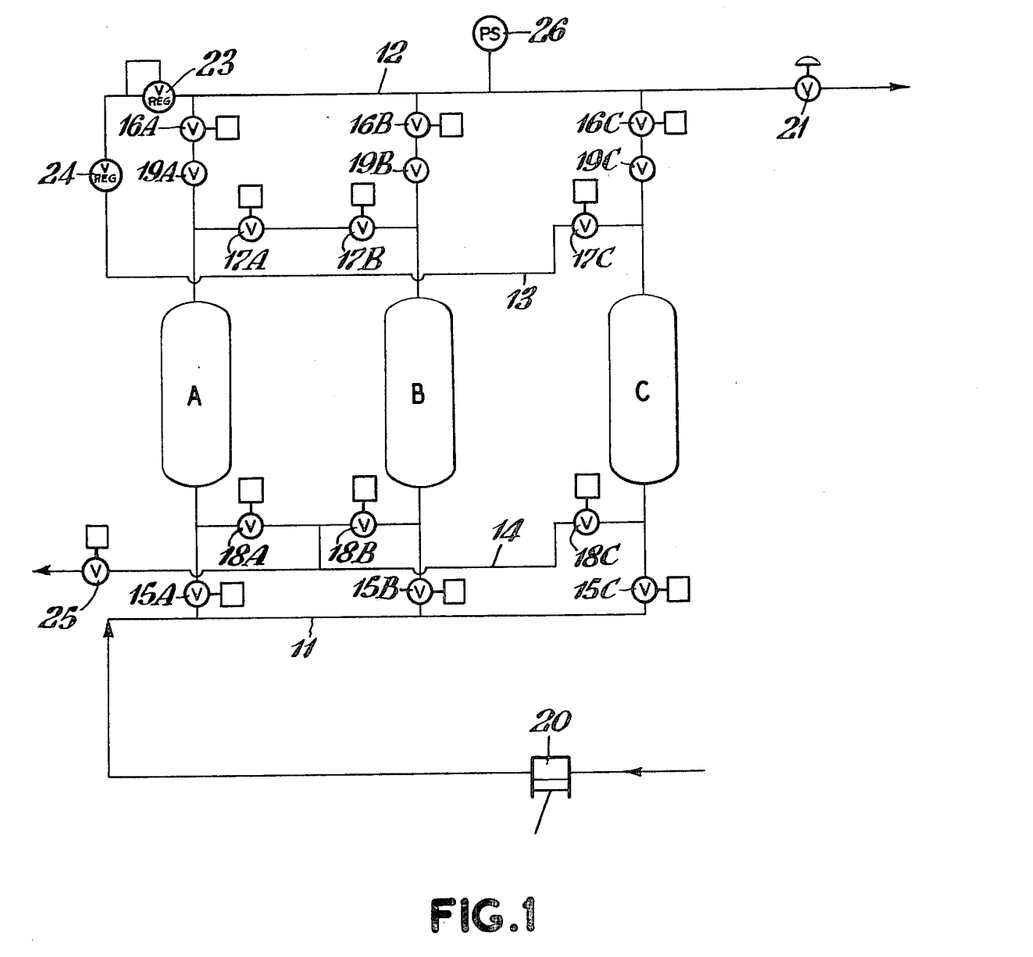
FIG. 1 is a schematic flow sheet of a three-adsorbent-bed embodiment of the invention.

Referring now to the drawings FIG. 1 shows three adsorbent beds A, B, and C connected in parallel flow relation between gas mixture manifold 11, one-component-depleted gas manifold 12, purge manifold 13 and waste manifold 14. Automatic valves 15A, 15B, and 15C direct feed gas flow respectively to first bed A, second bed B, and third bed C. Automatic valves 16A, 16B, and 16C respectively direct gas from the same beds into manifold 12. Purge manifold 13 joins one-component-depleted gas manifold 12 at the discharge end of the three beds, and purge gas is introduced through automatic valves 17A, 17B, and 17C to beds A, B, and C countercurrent to the direction of feed gas flow. Automatic valves 18A, 18B, and 18C join waste manifold 14 at the inlet end of the corresponding beds for discharge of countercurrent depressurization gas and purge gas. Valves 19A, 19B, and 19C at the discharge end upstream of product valves 16A, 16B, and 16C respectively are the manual trim type for limiting the flow of pressure equalization gas.

Figure 2:
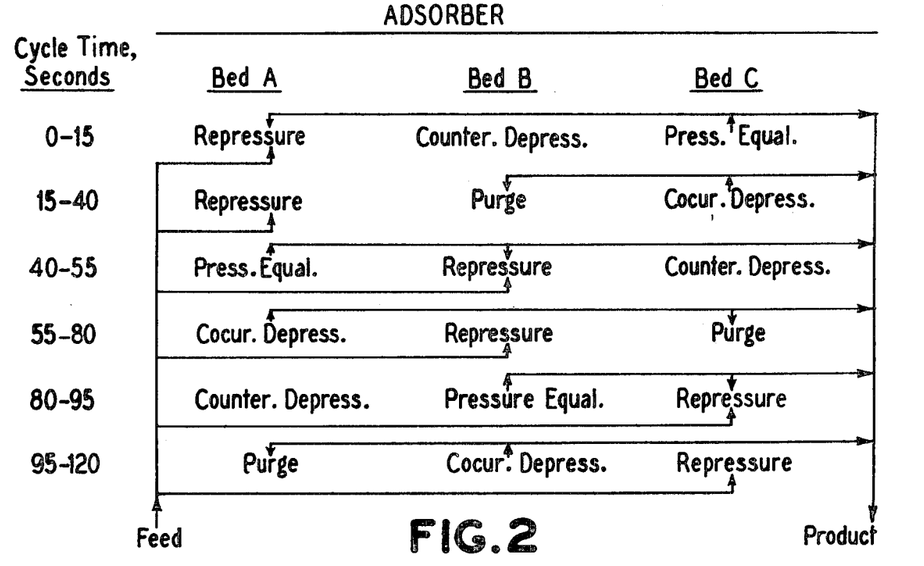
FIG. 2 is a time program for the various steps of a process embodiment suitable for use with the FIG. 1 apparatus.

FIG. 2 illustrates one timing sequence suitable for use with the FIG. 1 system, employing six distinct steps each involving commencement and/or termination of flows. Streams flowing into and out of the three-bed system are indicated by vertical lines flows in the feed manifold 11 and in the one-component-depleted gas manifold 12. The feed manifold 11 connects horizontally with each of the three adsorbent beds and the latter in turn join horizontally with the one-component-depleted manifold 12. The repressurization and purge steps which use a portion of the one-component-depleted gas are connected horizontally with the steps, e.g., cocurrent depressurization and pressure equalization which supply the one-component depleted gas. All interbed flows are identified on the figure.

It will be apparent from FIG. 2 that at any moment of time one of the adsorbent beds is delivering product at progressively diminishing pressure to the one-component-depleted gas manifold 12 as follows: bed C during 0–40 seconds, bed A during 40–50 seconds, bed A during 50–80 seconds, and bed B during 80–120 seconds. Accordingly, product flow to the consuming means is continuous.

In this particular cycle and in terms of any single bed, repressurization accounts for one-third of the total cycle, product flow and simultaneous pressure equalization or cocurrent depressurization account for one-third, and countercurrent depressurization and purge for the remaining one-third. The utilization within the system of the pressure equalization and cocurrent depressurization gas is indicated by horizontal flow lines. Each pressure equalization step is connected horizontally with a repressurization step in another bed having already been purged, and each cocurrent depressurization step is connected horizontally with a purge step of a different bed having just been countercurrently depressurized.

Each step in the cycle of bed A will now be outlined and related to those components of FIG. 1 which are involved in the cycle changes. Pressures illustrative of such operation for air separation using calcium zeolite A adsorbent are included.

Time 0–15: Bed A is being repressurized, bed B countercurrently depressurized, and bed C pressure equalized. Valves 15A and 16A are open and valves 17A and 18A are closed. Feed air is introduced to bed A at its inlet end from manifold 11 and one-component-depleted gas from manifold 12 is simultaneously introduced at the bed A discharge end. The latter is derived from bed C through trim valve 19C, valve 16C, and flows consecutively through valves 16A and trim valve 19A into bed A. Bed C is cocurrently depressurized during this period and the flow continues until pressures between beds A and C are substantially equalized at about 19 p.s.i.g. During this period, the flow of equalization gas is rapid while the flow of feed air from compressor 20 is limited, so that the major portion of the gas for repressurizing bed A from 0 to 19 p.s.i.g. is one-component-depleted gas, e.g., 72 percent for air separation. During this period, another part of the gas released from bed C is discharged as product in manifold 12.

Time 15–40: Valve 16A is now closed and only the flow of feed air continues to bed A until the terminal pressure of 40 p.s.i.g. is reached. This completes the repressurization period for bed A. During the repressurizations, a nitrogen adsorption front is established near the inlet end of bed A and moves progressively toward the discharge end. The feed gas quantity relative to the one-component-depleted gas used for repressurization is such that when the repressurization is completed, there remains a predetermined length of unloaded bed between the adsorption front and the discharge end.

Time 40–55: The pressure equalization step for bed A commences by closing valve 15A and opening valves 16A and 16B cocurrently depressurizing the bed by releasing gas from the discharge end. This gas flows through the unloaded bed length wherein the nitrogen component is adsorbed and the emerging nitrogen-depleted gas is employed in two parts. Oxygen product gas flows through control valve 21 in manifold 12 to the consumer conduit downstream valve 21 at a rate serving to hold the consumer conduit at a suitable low pressure such as 3 p.s.i.g. The remainder and major ("one" part in the summary) part of the nitrogen-depleted gas flows through valves 16B and 19B to the discharge end of bed B for partial repressurization thereof. Bed B has previously been purged of nitrogen adsorbate and is initially at the lowest pressure level of the system, about 0 p.s.i.g. This flow of one-component-depleted gas from bed A to bed B continues for about 15 seconds until the two beds are at substantially the same pressure as for example 19 p.s.i.g.

Time 55–80: Additional nitrogen-depleted gas is released from the bed A discharge end for further cocurrent depressurization thereof, with one part introduced to the bed C discharge end by closing opening valve 16B and automatic valve 17C in the purge manifold for purging nitrogen adsorbate at slightly above 0 p.s.i.g. Valves 23 and 24 reduce the purge gas pressure to essentially one atm., and also hold the flow rate of purge gas constant. This in turn holds the total quantity of purge gas constant since the purge step is preferably a fixed length of time. The flow rate is controlled at a steady value by regulating valve 23 which holds the pressure constant between the two valves 23 and 24. The waste gas emerging from the bed C inlet end flows through automatic valve 18C in waste manifold 14 and is released through automatic waste discharge valve 25. The last-mentioned valve is a flow-limiting device rather than the shut-off type. When "closed" it introduces a flow restriction into the waste manifold 14 which reduces the depressurization rate to a value below that causing attrition of the adsorbent particles. However, for the discharge of purge gas, valve 25 is open to remove the restriction inasmuch as flow is already limited by valve system 23, 24. Another part of the additional nitrogen-depleted gas from bed A is discharged as oxygen product. During this step the pressure of bed A and manifold 12 continues to decrease until it reaches about 6.5 p.s.i.g., which occurs after an additional 25 seconds (80 seconds into cycle or two-thirds of the total cycle). The lowest pressure limit for cocurrent depressurization, e.g., 6.5 p.s.i.g., should be maintained because the pressure corresponds to imminent breakthrough of the adsorption front at the discharge end of the bed. This completes the production phase for bed A.

Time 80-95: Bed A now begins its nitrogen adsorbate rejection (desorption) phase by closing valves 16A and 17C, and opening valve 18A. Additional gas at 6.5 p.s.i.g. is released from the bed A inlet end for countercurrent depressurization thereof through waste manifold 14 and discharge valve 25. The latter valve is "closed" for this step in order to introduce the aforesaid restriction and avoid excessive flow rates from the bed. This step continues to essentially 1 atmosphere in about 15 seconds.

Time 95-120: Bed A is purged of remaining nitrogen adsorbate by opening valves 17A and 25. Additional nitrogen-depleted gas from the discharge end of bed B flows through manifold 12 through valves 23, 24 and purge manifold 13, then through valve 17A to the bed A discharge end. The nitrogen-containing purge gas emerging through the bed A inlet end flows through valve 18A and is discharged through waste valve 25. Purging continues for 25 seconds at which time the full 120-second cycle is completed. Bed A is now ready for repressurization in the previously described manner.

Beds B and C are consecutively cycled through the aforediscussed steps with Bed B entering the simultaneous gas mixture one-component-depleted gas repressurization with the bed A pressure equalization step (time 40-55 seconds). Bed C enters the simultaneous gas mixture one-component-depleted repressurization with the bed A countercurrent depressurization step (time 80-95 seconds). The necessary valve changing for these steps will be recognized from FIGS. 1-2 and the foregoing description. A cycle control system is necessary to initiate and coordinate these valve changes. The cycle controller may for example receive a signal from pressure-sensing means in feed gas conduit 11 downstream compressor 20.

It should be understood that modifications of the FIG. 2 time program are contemplated. For example, the duration of the purge step need not exactly coincide with the cocurrent depressurization step of the bed providing the purge gas. The purge step of bed A may be terminated slightly before the cocurrent depressurization step of bed B is completed and purged bed A may be isolated during this short period before repressurization of same is started. Accordingly, all of the cocurrent depressurization gas from bed B is delivered as product during the bed A isolation and none is used internally.

Figure 3:
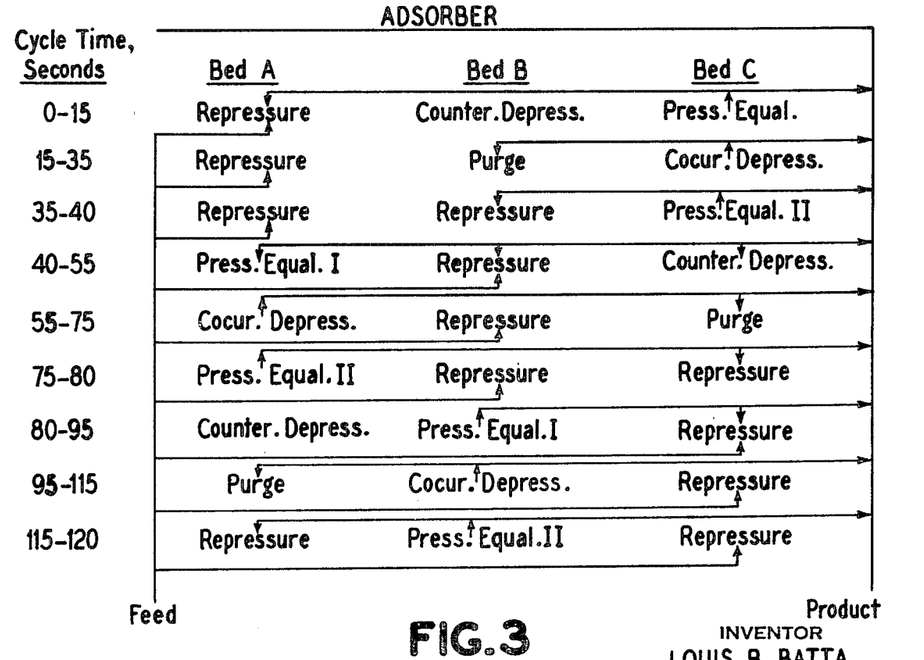
FIG. 3 is an alternative time program similar to FIG. 2 but employing two pressure equalization steps.

FIG. 3 illustrates a preferred embodiment of the three-bed system which can be practiced with the FIG. 1 apparatus. The FIG. 2 time schedule has been modified to provide two pressure equalization steps during depressurization of each bed rather than one. This permits higher product recovery while retaining the same product purity. A step-by-step comparison of FIG. 3 with FIG. 1 (for example bed A) shows that the simultaneous gas mixture one-component-depleted gas repressurization is of the same duration (0-15 seconds). Also, the total duration of the gas mixture further repressurization to the first highest superatmospheric pressure is the same (15-35 and 35-40 seconds). The first stage pressure equalization in FIG. 3 is similar to the single pressure equalization of FIG. 2 (40-55 seconds) except that it continues to 23 p.s.i.g. rather than to 19 p.s.i.g. However, the cocurrent depressurization of FIG. 3 is 5 seconds shorter than FIG. 2 so that the terminal pressure of bed A is about 11 p.s.i.g. instead of 6.5 p.s.i.g.

During the second stage pressure equalization (75-80 seconds), more nitrogen-depleted gas is released from the bed A discharge end and directed into the bed C discharge end. Valve 18C is closed so that bed C is partially repressurized. This flow continues until the gas pressures in beds A and C are substantially equal. This occurs after about 5 seconds and at 5 p.s.i.g.

The countercurrent depressurization steps of FIGS. 2 and 3 are of the same duration (80-95 seconds), but the FIG. 3 purge step is 5 seconds shorter (95-115 seconds instead of 95-120 seconds). In the final 5 seconds of the process, the purged bed is partially repressurized by flow of nitrogen-depleted gas from the discharge end of bed B into the first-bed discharge end until the two beds are pressure-equalized to about 5 p.s.i.g., i.e., the second stage pressure equalization of bed B.

The advantages of the invention were illustrated in a series of tests employing the three-bed embodiment of FIG. 1 with the time programs of FIGS. 2 and 3.

TEST A

Each of the three adsorbent beds was 26 inches inside diameter and 96 inches long, containing 1,300 pounds of 1/16-inch diameter calcium zeolite A pellets. Air was compressed to 55 p.s.i.a. and fed to the system at an average rate of 6,100 cu.ft./hr. S.T.P. without pretreatment, i.e., without drying or $CO_2$ removal. Referring to FIG. 2, each bed was repressurized by simultaneous introduction of compressed air and nitrogen-depleted gas (oxygen) to an equalization pressure of about 34 p.s.i.a. (35 p.s.i.a. source bed and 33 p.s.i.a. receiving bed). The final repressurization with compressed air was continued to the full 55 p.s.i.a. level. In the next step, the finally repressurized bed was equalized with simultaneous delivery of product to about 34 p.s.i.a. Next, the bed was further cocurrently depressurized to about 21.5 p.s.i.a. while simultaneously providing purge gas for another bed and product for consumption. The bed was then countercurrently depressurized to about 16 p.s.i.a. and countercurrently purged at the same pressure level. Oxygen product was delivered at a rate of 745 cu.ft./hr. S.T.P. at a pressure of 20 p.s.i.a. and a purity of 90.9 percent oxygen. The oxygen product recovery was 53 percent of the oxygen introduced in the feed gas. This recovery is substantially higher than that attainable using the four-bed system of Wagner U.S. Pat. No. 3,430,418 and the plant investment for adsorbent beds and related piping is reduced by about one-fourth.

TEST B

The same system was used as in Test A, but pressure equalization was accomplished in the two-step manner of FIG. 3. Compressed air at 55 p.s.i.a. was fed to the system at an average rate of 6,458 cu.ft./hr. S.T.P. without pretreatment. Each bed was first repressurized by equalization with a second bed to a lower pressure of about 20 p.s.i.a., next by equalization with a third bed while simultaneously introducing feed gas to a higher pressure of about 38 p.s.i.a., and finally by compressed air only to the 55 p.s.i.a. level. The bed was then first pressure equalized with a second bed at about 38 p.s.i.a. while simultaneously discharging oxygen product. Next, it was cocurrently depressurized to provide purge gas for a third bed and also continued to discharge product oxygen, the terminal pressure being 25.5 p.s.i.a. In the ensuing second pressure equalization with a third bed and simultaneous product oxygen discharging, the terminal pressure was 20 p.s.i.a. The bed was then countercurrently depressurized to a purge pressure of about 15.5 p.s.i.a., followed by purging with nitrogen-depleted gas (oxygen) from the second bed. Oxygen product was delivered at a rate of 750 cu.ft./hr. S.T.P. at 20 p.s.i.a. and a purity of 90 percent oxygen. The oxygen product recovery was 55.5 percent of the oxygen introduced. This recovery is comparable with that attainable using the four-bed two-step pressure equalization system of my parent application, Ser. No. 787,847.

Summarizing the three-bed embodiments of FIGS. 1-3 the gas mixture is simultaneously introduced at superatmospheric pressure to the first-bed inlet end and one-component-depleted gas is introduced initially at first highest superatmospheric pressure to the first-bed discharge end, the bed having previously been cleaned of the one component and initially at lower pressure. Simultaneously with the aforementioned introductions, one-component-depleted gas is released from the third-bed discharge end with one part of the so-released gas comprising the aforementioned one-component-depleted gas introduced to the the first-bed discharge end and another part being simultaneously discharged as product.

After the first and third beds are pressure-equalized the one-component-depleted gas flow from the third to the first bed is terminated and the gas mixture introduced to the first-bed inlet end continued for further repressurization of the first bed to the first highest pressure.

One-component-depleted gas is released from the third-bed discharge end for further cocurrent depressurization thereof during at least part of the feed gas mixture further repressurization of the first bed. The third-bed further cocurrent depressurization is terminated before the one-component adsorption front reaches the discharge end. One part of the so-released gas is introduced to the second-bed discharge end for purging the one-component adsorbate therefrom at the lowest pressure, and another part of the so-released gas is discharged as product. Next, one-component-depleted gas is released from the further repressurized first-bed discharge end with one part thereof employed for partial repressurization of the second bed having previously been purged. The one part is introduced to the second-bed discharge end until the gas pressures in the first and second beds are substantially equal. Another part of the one-component-depleted gas from the first bed is simultaneously discharged as product. In the following step additional one-component-depleted gas is released from the discharge end of the partially depressurized first bed, one part thereof is introduced to the third-bed discharge end for purging the one component at the lowest pressure, and another part of the so-released gas is discharged as product.

Now the first bed is ready for the one-component-adsorbate rejection steps. Still additional gas is released from the first-bed inlet end for countercurrent depressurization thereof to the lowest pressure and partial desorption of the one component. Finally, the first bed is purged of the remaining one component by introducing one-component-depleted gas from the second bed to the first-bed discharge end for flow therethrough at the lowest pressure and the aforementioned steps are consecutively repeated. The second and third adsorbent beds are consecutively cycled through the aforedescribed first-bed steps with the second bed entering the simultaneous gas mixture one-component-depleted gas introduction step with the first-bed one-component-depleted gas-releasing step. The third bed enters the simultaneous gas mixture one-component-depleted gas introduction with the first-bed countercurrent depressurization.

In the preferred two-step pressure equalization embodiment of the three-bed process, more one-component-depleted gas is released from the first-bed discharge end after the additional cocurrent-releasing of such gas and before the countercurrent releasing (depressurization) step, the so-released gas being introduced to the third-bed discharge end following purging of the one component therefrom. This flow is continued until the first and third beds are equalized at second pressure lower than the first-second-bed pressure equalization. The third bed is partially repressurized during this two-step pressure equalization of the first bed. In an analogous manner, more one-component-depleted gas is released from the second-bed discharge end and introduced to the first-bed discharge end following the first-bed purge step and before the first-bed simultaneous gas mixture one-component-depleted gas introduction. Similarly, more one-component-depleted gas is released from the third-bed discharge end and introduced to the second-bed discharge end during the gas mixture further repressurization of the first bed.

This invention may also be advantageously employed with only two adsorbent beds and will obtain substantially higher product purity and recovery than prior art two-bed systems, although the performance in terms of product recovery is inferior to the aforedescribed three-bed embodiments of this invention. However, if space and weight are the key considerations as for example with airborne oxygen production, a two-bed embodiment may be preferred.

Figure 4:
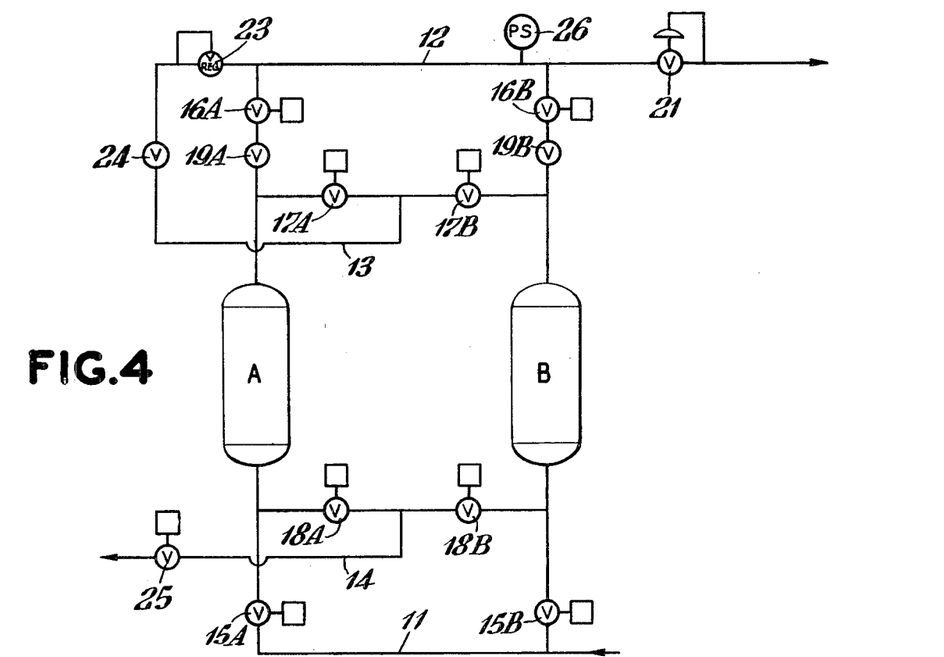
FIG. 4 is a schematic flow sheet of a two-adsorbent-bed embodiment.
Figure 5:
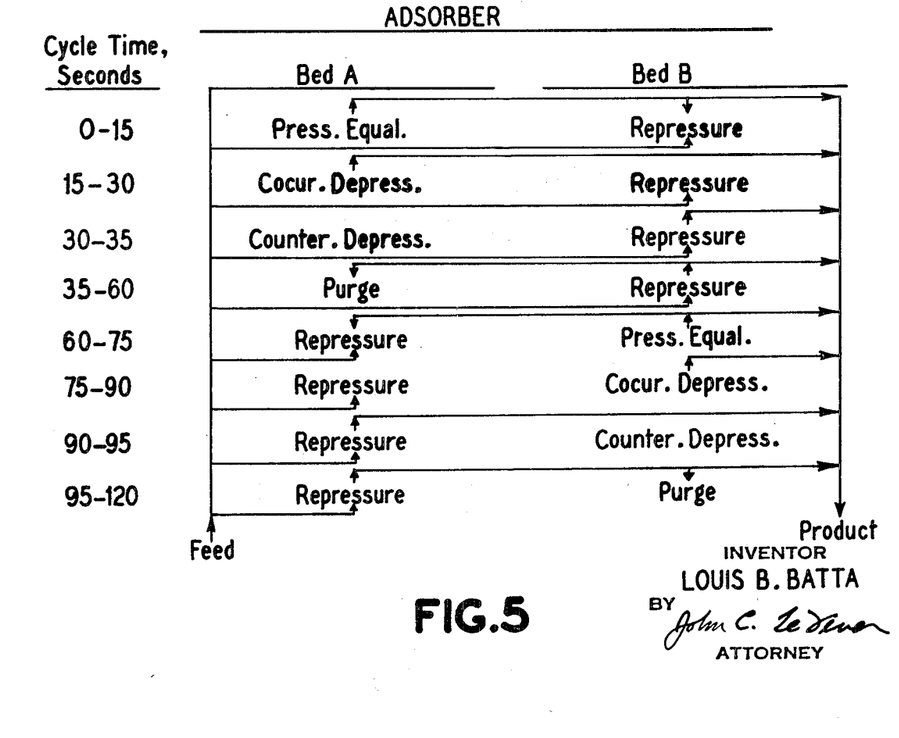
FIG. 5 is a time program for the various steps of a process embodiment suitable for use with the FIG. 4 apparatus.

FIG. 4 shows two adsorbent beds A and B connected in parallel flow relation, with conduits and valves identified by the same numerals used to identify the corresponding components in the three-bed embodiment of FIG. 1. FIG. 5 illustrates one timing sequence suitable for use with the FIG. 4 system employing the same six distinct steps as the three-bed embodiment but with certain modifications to be described hereinafter in detail. Each step in the cycle of bed B will now be outlined and related to those components of FIG. 4 which are involved in the cycle changes. Pressures illustrative of such operation for air separation using calcium zeolite A adsorbent are included.

Time 0–15: Bed B is being repressurized and bed A pressure equalized with valves 15B, 16A and 16B open and valves 17B and 18B closed. Flow continues until pressures between beds A and B are substantially equalized at about 19 p.s.i.g., and during this period another part of the released gas from bed A is discharged as product in manifold 12. This step is identical to the corresponding step of FIG. 2.

Time 15–30: Valve 16B is now closed and only the flow of feed air continues to bed B for further repressurization for an additional 15 seconds to a pressure of about 30 p.s.i.g. During this same period bed A is being cocurrently depressurized by the flow of released gas from its discharge end through valves 16A and 19A to product conduit 12, and this step continues until the nitrogen adsorption front has approached the discharge end and breakthrough is imminent, the terminal pressure of bed A being about 6.5 p.s.i.g.

Time 30–35: Since bed A has been cocurrently depressurized to its minimum production pressure, it can no longer deliver product to the consumer and valve 16A closes. In order for product flow to be uninterrupted, the product must be derived from bed B during the remainder of its repressurization step to the highest feed gas mixture pressure in conduit 11, e.g., 40 p.s.i.g. Accordingly, valve 16B again opens and product gas flows therethrough to product manifold 12. Simultaneously, valve 18A opens and waste valve 25 closes for countercurrent depressurization of bed A to 0 p.s.i.g.

The aforedescribed simultaneous feed gas inlet end repressurization-product gas discharge is not my invention but claimed in copending application, Ser. No. 158,779, filed July 1, 1971 in the name of Norman R. McCombs. However, it may be practiced as one step in the process of my invention and is described herein to illustrate this relationship.

Time 35–60: Repressurization of bed B with compressed feed air continues until the 40 p.s.i.g. terminal pressure is reached. However, during this 25-second period only part of the gas emerging from the bed B discharge end is passed to the product-consuming means. Another part is directed to countercurrently depressurized bed A for countercurrent purging thereof, by opening valves 17A and 25. Product quality gas then flows through valves 23, 24 and 17A to the bed A discharge end for purging. During this bed A purge, the feed gas flow to bed B is substantially greater than the rate of product gas flow from its discharge end. The pressure of bed B rises progressively until the terminal pressure of 40 p.s.i.g. is reached.

Time 60–75: The pressure equalization step for bed B and repressurization of bed A are commenced while the former continues to deliver product. This is accomplished by opening valve 16A and closing valve 15B. This step is analogous to the 40–55-second step of bed A in FIG. 2. Beds A and B are pressure-equalized at about 19 p.s.i.g.

Time 75–90: Bed B is next cocurrently depressurized to about 6.5 p.s.i.g. with all the released gas being delivered as product and the repressurization of bed A continues but only by the introduction of feed gas at the inlet end. This requires closing valve 16A.

Time 90–95: Bed B is countercurrently depressurized to about 1 atmosphere pressure by closing valves 16B and 25, and opening valve 18B. Valve 16A is opened for one-component-depleted flow from the bed A discharge end to manifold 12 and discharged as product.

Time 95–120: Bed B is countercurrently purged with one-component-depleted gas from bed A which is simultaneously being repressurized to the feed gas terminal pressure of 40 p.s.i.g. This is accomplished by opening valves 17B and 25. At the end of this step, valves 17B and 18B are closed and bed B is again ready for repressurization in accordance with the foregoing sequence.

It was previously indicated that an important advantage of the present invention is the elimination of at least one adsorbent bed together with its associated valving and piping, while still retaining high product purity and recovery, and while yielding product at smooth uninterrupted rate. However, the invention may also be employed with four adsorbent beds in which case the advantages other than reduced equipment cost are still realized. The process still omits the conventional adsorption step wherein all of the feed gas is introduced at the maximum head pressure, by introducing such gas during repressurization of each adsorbent bed. The feed gas compressor delivers the gas over a range of pressures increasing from purge pressure to the maximum head pressure, so that its average delivery pressure is substantially below the maximum pressure and power savings can be obtained. Another advantage of the four-bed embodiment is delivery of product to the consumer at higher pressure than the two- or three-bed systems. For example, whereas the aforedescribed three-bed air separation example preferably delivers oxygen product at about 5 p.s.i.g., the optimum pressure for the four-bed system of FIGS. 6 and 7 is about 15 p.s.i.g.

Figure 6:
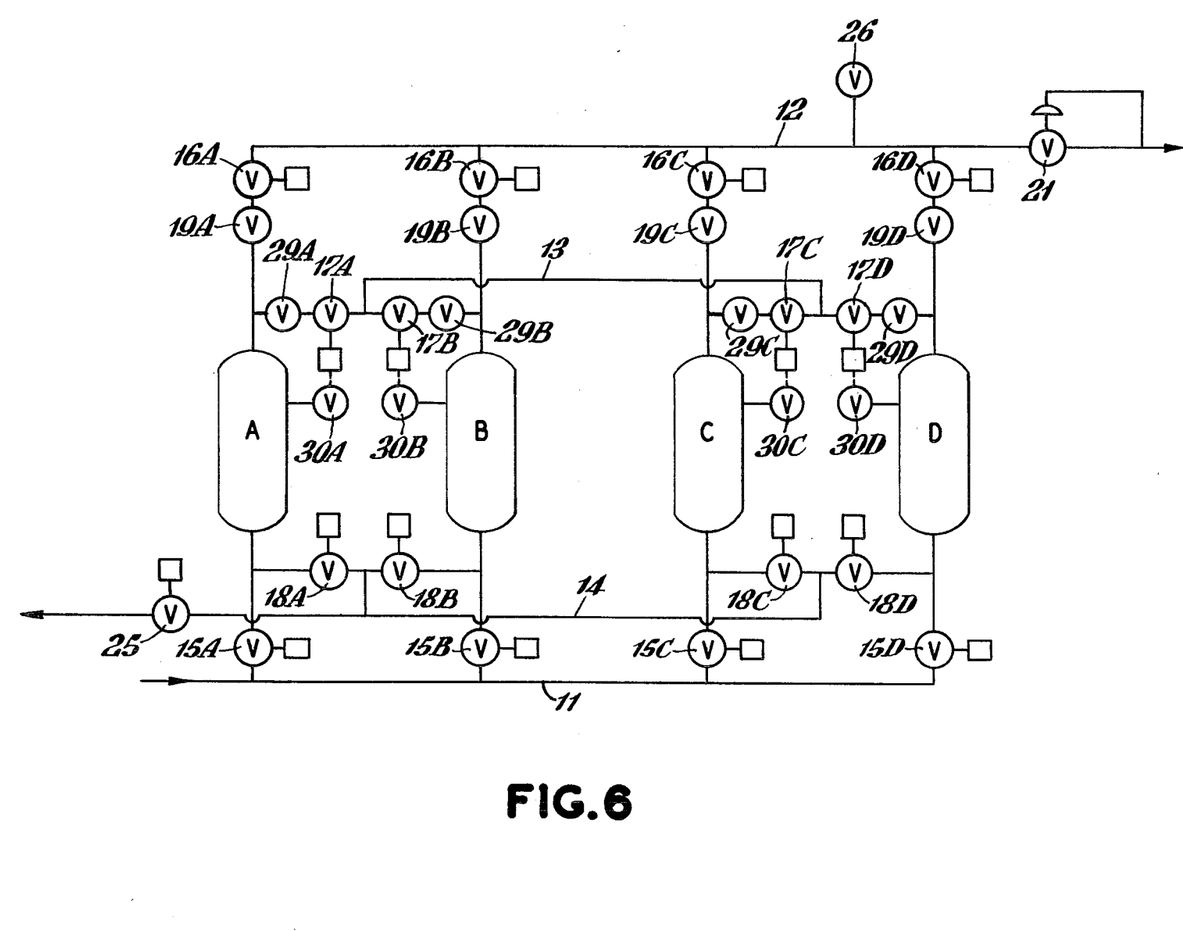
FIG. 6 is a schematic flow sheet of a four-adsorbent-bed embodiment.
Figure 7:
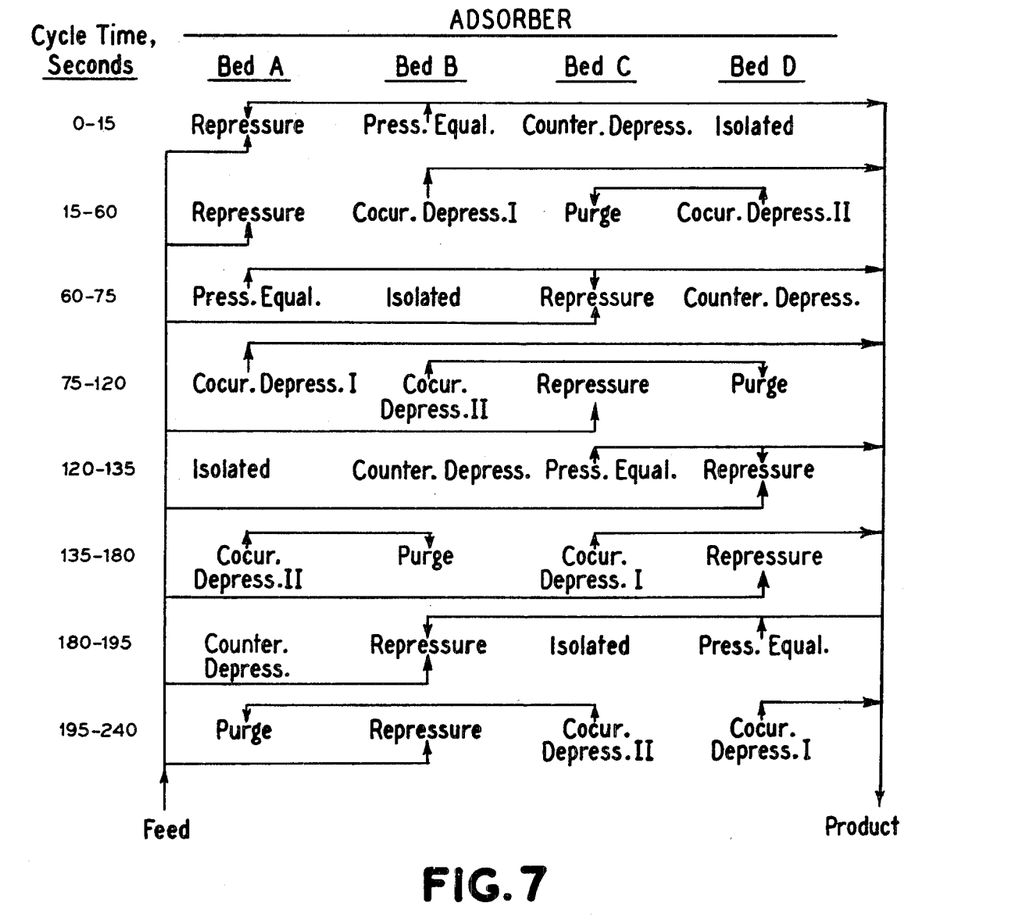
FIG. 7 is a time program for the various steps of a process embodiment suitable for use with the FIG. 6 apparatus.

Comparison of FIGS. 6 and 7 with the corresponding two- and three-bed illustrations will show that the former also includes the broad steps outlined in the summary. Gas mixture is introduced to the feed end and one-component-depleted gas is simultaneously introduced to the product (discharge) end of each bed for partial repressurization of the receiving bed until the bed is pressure-equalized with the source bed, after which the receiving bed is further repressurized only with the feed gas mixture. The aforementioned source bed for the one-component-depleted gas simultaneously delivers product gas for consumption. The further repressurized receiving bed is thereafter depressurized at its discharge end to provide one-component-depleted gas used as: (1) purge gas, (2) repressurization gas, and (3) product gas.

A significant difference between the four-bed embodiment and the previously described two- and three-bed embodiments is that the cocurrent depressurization is interrupted for a short period awaiting completion of countercurrent depressurization of another bed. When the latter is completed, the remaining cocurrent depressurization gas is used to purge the countercurrently depressurized bed.

Each step in the FIG. 7 cycle of bed A will now be outlined and related to the FIG. 6 components involved in the cycle changes, along with illustrative pressures for air separation using calcium zeolite A adsorbent.

Time 0-15: Bed A is partially repressurized by pressure equalization with bed B at about 19 p.s.i.g. and by simultaneous admission of feed gas mixture. Valves 17A and 18A are closed and valves 15A and 16A are opened.

Time 15-60: Bed A is further repressurized to the highest feed gas mixture pressure by closing valve 16A, and only feed gas is introduced at the inlet end until the bed pressure reaches 40 p.s.i.g. after 60 seconds total cycle time.

Time 60-75: Bed A is pressure-equalized with bed C and simultaneously discharges product gas until the two beds reach about 19 p.s.i.g. This is accomplished by closing valve 15A and opening valves 16A and 16C.

Time 75-120: In the first cocurrent depressurization step, all of the gas from bed A is discharged as product by closing valve 16C, so that the bed pressure drops to about 17 p.s.i.g. at 120 seconds cycle time.

Time 120-135: The bed is isolated for 15 seconds by closing valve 16A.

Time 135-180: In the second cocurrent depressurization step of bed A, valves 17A and 17B are opened and one-component-depleted gas flows to the bed B discharge end for countercurrent purging. When a preset pressure of about 6.5 p.s.i.g. is sensed in bed A by pressure switch 30A, valve 17A is closed to terminate the purge step at about 180 seconds cycle time.

Time 180-195: Bed A is countercurrently depressurized to about 0 p.s.i.g. by opening valve 18A and closing valve 25.

Time 195-240: One-component-depleted gas from bed C is released during its second (lower) cocurrent depressurization step for countercurrent purging of bed A. Valves 17A, 17C and 25 are open and the adsorbate-containing purge gas emerging from the bed A inlet end flows through valve 18A and waste valve 25 for release to the atmosphere. Purging continues until pressure switch 30C senses that the pressure of bed C has dropped to 6.5 p.s.i.g. Finally, valves 17A and 18A close and valves 15A and 16A open to reinitiate repressurization of bed A.

Summarizing the four-bed embodiment, the feed gas mixture and one-component-depleted gas are simultaneously introduced at opposite ends of the first bed with the latter gas being released from the second-bed discharge end. Flow is continued until the first and second beds are pressure-equalized and during this period product is also discharged from the second bed. During further repressurization of the first bed to the first highest pressure of the feed gas mixture by the feed gas only, gas is released from the second-bed discharge end for further cocurrent depressurization thereof. This release is terminated at second lower pressure such that the one-component adsorption front is nearer the second-bed discharge end than at the end of the pressure equalization with the first bed. The so-released gas from the second bed is discharged as product.

Next, one-component-depleted gas is released from the further repressurized first-bed discharge end with one part thereof employed for partial repressurization of a third bed initially at the lowest pressure and having previously been purged of the one component. This gas is introduced to the third-bed discharge end until the gas pressures in first and third beds are substantially equal. Another part of the one-component-depleted gas simultaneously released from the first-bed discharge end is discharged as product. In the succeeding first cocurrent depressurization step, additional one-component-depleted gas is released from the partially depressurized first-bed discharge end as product. This step is terminated with the first-component adsorbent front intermediate the inlet and discharge ends; such adequate gas (e.g., 20 p.s.i.g.) remains in the bed to subsequently perform the purge step of another bed. Then the first bed is isolated for a time period. Following the isolation still additional one-component-depleted gas is released from the further depressurized first-bed discharge end and introduced to the second-bed discharge end for purging the one component therefrom at the lowest pressure of the process. This releasing is terminated when the one-component adsorption front is closer to the first-bed discharge end than at the completion of the first cocurrent depressurization, but still entirely within the bed.

Gas is now released from the first-bed inlet end for countercurrent depressurization thereof to the lowest pressure and partial desorption of the one component. Finally, the first bed is purged of the remaining one component by introducing one-component-depleted gas from the third bed to the discharge end for flow at the lowest pressure. The aforedescribed steps are consecutively repeated beginning with the simultaneous gas mixture one-component-depleted gas introduction for partial repressurization of the first bed.

The third, fourth and second adsorbent beds are consecutively cycled through steps corresponding to the aforedescribed first-bed steps, the third bed entering simultaneous gas mixture one-component-depleted gas introduction with the first- and third-bed pressure equalization step. The fourth bed enters the same simultaneous gas mixture one-component-depleted gas introduction step with the first-bed isolation step, and the second bed enters the same step with the first-bed countercurrent depressurization step.

Although certain embodiments have been described in detail, it will be appreciated that other embodiments are contemplated along with modifications of the disclosed features, as being within the scope of the invention.

For example, although calcium zeolite A has been specifically described as the adsorbent, the selection of a suitable adsorbent depends on such well-known factors as the composition of the feed gas to be separated, and is not part of this invention. Other well-known selective adsorbents include activated carbon and silica gel. Also, although the preferentially adsorbable-component-depleted gas has been described as the source of the product gas, in some systems it may be desirable to recover the adsorbate as product.

The invention has been specifically described for separating air; it may also be used for separating other gas mixtures for example feeds containing hydrogen as the nonpreferentially adsorbed product component and various impurities as selectively adsorbable components. These include light hydrocarbons, CO, $CO_2$, $NH_3$, $H_2S$, argon and water. Hydrogen-rich feed gas containing at least one of these absorbable components include: catalytic reformer off-gas, methanol synthesis loop purge, dissociated ammonia and demethanizer overhead gas, steam-reformed hydrocarbons, ammonia synthesis loop purge gas, electrolytic hydrogen and mercury cell hydrogen. The invention is also useful for separating any or all of the aforementioned adsorbables from gas mixtures in which nitrogen or helium is the primary constituent.

What is claimed is:

1. In an adiabatic process for separating gas mixtures by selectively adsorbing at least one component in an adsorption zone at higher pressure and desorbing the selected component by pressure reduction to a lowest pressure, the improvement comprising the steps of:
   a. providing at least two beds of selective adsorbent material each with inlet and discharge ends;
   b. simultaneously introducing said gas mixture at superatmospheric pressure to the inlet end and introducing one-component-depleted gas initially at first highest superatmospheric pressure to the discharge end of a first adsorbent bed having previously been cleaned of said one component and initially at lower pressure;
   c. simultaneously with step (b), releasing gas from the discharge end of a second adsorbent bed initially at substantially said first highest pressure and having previously received said gas mixture at its inlet end in sufficient quantity for an adsorption front of said one component to have been formed at said inlet end and progressively moved to a position intermediate said inlet end and said discharge end, flowing one part of the so-released gas to the first-bed discharge end as said one-component-depleted gas and simultaneously discharging another part of said so-released gas as product;
   d. continuing the gas flows of steps (b) and (c) until the gas pressures in said first and second adsorbent beds are substantially equal, and then terminating the one-component-depleted gas flow from the second bed to the first bed;
   e. continuing the introduction of said gas mixture to the inlet end of said first bed after the one-component-depleted gas flow termination of step (d) thereby further repressurizing said first bed to higher pressure above the equalization pressure of step (d);
   f. releasing one-component-depleted gas from the discharge end of the further repressurized first bed and employing one part thereof for purging said one component from said second adsorbent bed at said lowest pressure, employing another part of the released gas for repressurization of another adsorbent bed having previously been cleaned of said one component by introduction to the discharge end thereof, and discharging still another part of the released gas as product; and
   g. purging said first bed of said one component by introducing one-component-depleted gas from a different bed to the discharge end thereof for flow therethrough at said lowest pressure.

2. A process according to claim 1 wherein said gas mixture is air and said selective adsorbents is calcium zeolite A, and said one-component-depleted gas comprises the major portion of gas repressurizing said first adsorbent bed in steps (b), (c) and (d).

3. A process according to claim 1 wherein gas is released from the discharge end of said second bed for further cocurrent depressurization thereof during at least part of step (e), said release being terminated before the adsorption front of said one component reaches the second-bed discharge end, and at least part of the so-released gas is discharged as product.

4. A process according to claim 1 wherein gas is released from the discharge end of said second bed for further cocurrent depressurization thereof during at least part of step (e), said release being terminated before the adsorption front of said one component reaches the second-bed discharge end, one part of the so-released gas being discharged as product and another part of the so-released gas being introduced to the discharge end of another bed containing said one component for purging thereof.

5. A process according to claim 3 wherein gas is released from the inlet end of said second bed after termination of said further cocurrent depressurization for still further countercurrent depressurization thereof and partial desorption of said one component, and thereafter introducing said one part of one-component-depleted gas from said first bed to the discharge end of the still further depressurized second bed as said purging of step (f).

6. In an adiabatic process for separating gas mixtures by selectively adsorbing at least one component in an adsorption zone at higher pressure and desorbing the selected component by pressure reduction to a lowest pressure, the improvement comprising the steps of:
   a. providing three beds of selective adsorbent material each with inlet and discharge ends;
   b. simultaneously introducing said gas mixture at superatmospheric pressure to the inlet end and introducing one-component-depleted gas initially at said first highest superatmospheric pressure to the discharge end of a first adsorbent bed having previously been cleaned of said one component and initially at lower pressure;
   c. simultaneously with step (b), releasing gas from the discharge end of a third adsorbent bed initially at substantially said first highest pressure and having previously received said gas mixture at inlet end in sufficient quantity for an adsorption front of said one component to have been formed at said inlet end and progressively moved to a position intermediate said inlet end and said discharge end, flowing one part of the so-released gas to the first-bed discharge end as said one-component-depleted gas and simultaneously discharging another part of said so-released gas as product;
   d. continuing the gas flows of steps (b) and (c) until the gas pressures in said first and third adsorbent beds are substantially equal, and then terminating the one-component-depleted gas flow from the third bed to the first bed;
   e. continuing the introduction of said gas mixture to the inlet end of said first bed after the one-component-depleted gas flow termination of step (d) thereby further repressurizing said first bed to said first highest pressure, and releasing gas from the discharge end of said third bed for further cocurrent depressurization thereof during at least part of the gas mixture introduction to said first bed and terminating said release before the one-component-adsorption front reaches the third-bed discharge end and introducing one part of the so-released gas to the discharge end of a second adsorbent bed for purging said one component at said lowest pressure, and discharging another part of the so-released gas as product gas;

f. releasing one-component-depleted gas from the discharge end of the further repressurized first bed, employing one part thereof for partial repressurization of said second adsorbent bed having previously been purged of said one component by introduction to the second-bed discharge end until the gas pressures in said first and second adsorbent beds are substantially equal, and discharging another part of the so-released gas as product;

g. releasing additional one-component-depleted gas from the discharge end of the partially depressurized first bed, introducing one part thereof to the third-bed discharge end for purging said one component at said lowest pressure, and discharging another part of the so-released gas as product;

h. releasing still additional gas from the inlet end of said first bed for countercurrent depressurization thereof to said lowest pressure and partial desorption of said one component;

i. purging said first bed of remaining one component by introducing one-component-depleted gas from said second bed to the discharge end thereof for flow therethrough at said lowest pressure and thereafter consecutively repeating steps (b) through (i); and j. cycling said second and third adsorbent beds consecutively through steps corresponding to the first-bed steps (b) through (i) with the second bed entering the simultaneous gas mixture one-component-depleted gas-introducing of step (b) with the first-bed gas-releasing of step (f) and the third bed entering said simultaneous gas mixture one-component-depleted gas-introducing of step (b) with the first-bed countercurrent depressurizing of step (h).

7. A process according to claim 6 wherein more one-component-depleted gas is released from the first-bed discharge end after step (g) and before step (h) and introduced to the third-bed discharge end following purging of said one component therefrom, and the flow is continued until the gas pressures in the first and third beds are substantially equal at second equalization pressure lower than the first-second-bed pressure equalization of step (f) and said third bed is partially repressurized; and more one-component-depleted gas is released from the second-bed discharge end after the second-bed step (g) and before second-bed step (h) and introduced to the first-bed discharge end following the first-bed purge step (i) and before first-bed step (b) and the flow is continued until the gas pressures in the first and second beds are substantially equal at said second equalization pressure and said first bed is partially repressurized; and more one-component-depleted gas is released from the third-bed discharge end after the third-bed step (g) and before third-bed step (h) and introduced to the second-bed discharge end during the first-bed further repressurization step (e) and the flow is continued until the gas pressures in the third and second beds are substantially equal at said second equalization pressure and said second bed is partially repressurized.

8. A process according to claim 7 wherein said gas mixture is air and said selective adsorbent is calcium zeolite A.

9. In an adiabatic process for separating gas mixtures by selectively adsorbing at least one component in an adsorption zone at higher pressure and desorbing the selected component by pressure reduction to a lowest pressure, the improvement comprising the steps of:

a. providing four beds of selective adsorbent material each with inlet and discharge ends;

b. simultaneously introducing said gas mixture at superatmospheric pressure to the inlet end and introducing one-component-depleted gas initially at higher than said lowest pressure to the discharge end of a first adsorbent bed having previously been cleaned of said one component and initially at said lowest pressure;

c. simultaneously with step (b), releasing gas from the discharge end of a second adsorbent bed initially at higher than said lowest pressure and having previously received said gas mixture at its inlet end in sufficient quantity for an adsorption front of said one component to have been formed at said inlet end and progressively moved to a position intermediate said inlet end and said discharge end, flowing one part of the so-released gas to the first-bed discharge end as said one-component-depleted gas and simultaneously discharging another part of said so-released gas as product;

d. continuing the gas flows of steps (b) and (c) until the gas pressures in said first and second adsorbent beds are substantially equal, and then terminating the one-component-depleted gas flow from the second bed to the first bed;

e. continuing the introduction of said gas mixture to the inlet end of said first bed after the one-component-depleted gas flow termination of step (d) thereby further repressurizing said first bed to said first highest pressure, and simultaneously releasing gas from the discharge end of said second bed for further cocurrent depressurization thereof during the feed gas introduction to said first bed and terminating said release at second lower pressure such that the one-component adsorption front is nearer the second-bed discharge end than the intermediate position of step (c), and discharging the so-released gas as product;

f. releasing one-component-depleted gas from the discharge end of the further repressurized first bed, employing one part thereof for partial repressurization of a third adsorbent bed initially at said lowest pressure having previously been purged of said one component by introduction to the third-bed discharge end until the gas pressures in said first and third adsorbent beds are substantially equal, and discharging another part of the so-released gas as product;

g. releasing additional one-component-depleted gas from the discharge end of the partially depressurized first bed as a first cocurrent depressurization step, and discharging same as product;

h. terminating the additional gas releasing of step (g) when the one-component adsorption front is intermediate the inlet and discharge ends and isolating said first bed for a time period;

i. releasing still additional one-component-depleted gas from the discharge end of the further depressurized first bed as a second cocurrent depressurization step, and introducing same to the discharge end of said second bed for purging said one component therefrom at said lowest pressure and terminating said releasing when the one-component adsorption front is closer to the discharge end than at the termination (h) but still entirely within said first bed;

j. releasing gas from the inlet end of said first bed for countercurrent depressurization thereof to said lowest pressure and partial desorption of said one component;

k. purging said first bed of remaining one component by introducing one-component-depleted gas from a third adsorbent bed to the discharge end thereof for flow therethrough at said lowest pressure and thereafter consecutively repeating steps (b) through (k); and l. consecutively cycling said third, fourth and second adsorbent beds through steps corresponding to the first-bed steps (b) through (k) with the third bed entering the simultaneous gas mixture one-component-depleted introducing of step (b) with the first-bed gas releasing of step (f), the fourth bed entering said simultaneously gas mixture one-component-depleted gas-introducing of step (b) with the first-bed isolating of step (h), and the second bed entering said simultaneously gas mixture one-component-depleted gas-introducing of step (b) with the first-bed countercurrent depressurization of step (j).

10. A process according to claim 9 wherein said gas mixture is air and said selective adsorbent is calcium zeolite A.

* * * * *